US006988235B2

(12) United States Patent
Brown

(10) Patent No.: US 6,988,235 B2
(45) Date of Patent: Jan. 17, 2006

(54) CHECKSUM ENGINE AND A METHOD OF OPERATION THEREOF

(75) Inventor: David A. Brown, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 307 days.

(21) Appl. No.: 09/798,479

(22) Filed: Mar. 2, 2001

(65) Prior Publication Data

US 2001/0049808 A1    Dec. 6, 2001

Related U.S. Application Data

(60) Provisional application No. 60/186,424, filed on Mar. 2, 2000, provisional application No. 60/186,516, filed on Mar. 2, 2000.

(51) Int. Cl.
  *H03M 13/00* (2006.01)
  *G06F 11/00* (2006.01)

(52) U.S. Cl. ........................ 714/758; 714/801; 714/54

(58) Field of Classification Search ................ 714/758, 714/801, 52, 54, 781, 805, 807, 819
See application file for complete search history.

(56) References Cited

U.S. PATENT DOCUMENTS

| | | | | |
|---|---|---|---|---|
| 5,058,110 A | * | 10/1991 | Beach et al. | 370/464 |
| 5,630,054 A | * | 5/1997 | Trang | 714/52 |
| 5,663,952 A | * | 9/1997 | Gentry, Jr. | 370/252 |
| 5,832,235 A | * | 11/1998 | Wilkes | 709/247 |
| 5,917,821 A | * | 6/1999 | Gobuyan et al. | 370/392 |
| 5,935,268 A | * | 8/1999 | Weaver | 714/758 |
| 5,987,022 A | * | 11/1999 | Geiger et al. | 370/349 |
| 6,032,197 A | * | 2/2000 | Birdwell et al. | 709/247 |
| 6,038,694 A | * | 3/2000 | Swallow | 714/781 |
| 6,122,670 A | * | 9/2000 | Bennett et al. | 709/236 |
| 6,182,267 B1 | * | 1/2001 | Kidd et al. | 714/807 |
| 6,198,735 B1 | * | 3/2001 | Pazhyannur et al. | 370/349 |
| 6,208,651 B1 | * | 3/2001 | Van Renesse et al. | 370/392 |
| 6,253,271 B1 | * | 6/2001 | Ram et al. | 710/306 |
| 6,314,095 B1 | * | 11/2001 | Loa | 370/352 |
| 6,427,169 B1 | * | 7/2002 | Elzur | 709/224 |
| 6,449,656 B1 | * | 9/2002 | Elzur et al. | 709/236 |
| 6,480,291 B1 | * | 11/2002 | Daniels et al. | 358/1.11 |
| 6,530,061 B1 | * | 3/2003 | Labatte | 714/807 |

\* cited by examiner

*Primary Examiner*—Shelly Chase
*Assistant Examiner*—Cynthia Britt

(57) ABSTRACT

A checksum engine for use with a fast pattern processor and a method of operation thereof. In one embodiment, the checksum engine includes a processing engine that performs partial checksums on at least a portion of each processing block associated with different protocol data units (PDUs), and a controller that coordinates an operation of the processing engine to allow the processing engine to provide a complete checksum from the partial checksums of the processing blocks associated with each of the PDUs.

21 Claims, 6 Drawing Sheets

CHECKSUM ENGINE AND A METHOD OF OPERATION THEREOF

CROSS-REFERENCE TO PROVISIONAL APPLICATION

This application claims the benefit of U.S. Provisional Application No. 60/186,424 entitled "FPP" to David Sonnier, et al., filed on Mar. 2, 2000, and of U.S. Provisional Application No. 60/186,516 entitled "RSP" to David Sonnier, et al., filed on Mar. 2, 2000, which is commonly assigned with the present invention and incorporated herein by reference as if reproduced herein in its entirety.

CROSS-REFERENCE TO RELATED APPLICATIONS

This application is related to the following U.S. Patent Applications:

| Reference No. | Title | Inventor | Date |
|---|---|---|---|
| Ser. No. 09/798,472 (BENNETT 5-6-2-3-10-3) | A Virtual Reassembly System And Method of Operation Thereof | Bennett, et al. | Filed Mar. 2, 2001 |
| Ser. No. 09/798,454 (BENNETT 4-1-4-1-2-4-2) | A Function Interface System And Method of Processing Issued Functions Between Co-Processors | Bennett, et al. | Filed Mar. 2, 2001 |

The above-listed applications are commonly assigned co-pending with the present invention and are incorporated herein by reference as if reproduced herein in their entirety.

TECHNICAL FIELD OF THE INVENTION

The present invention is directed, in general, to a communications system and, more specifically, to a checksum engine and a method of operating the same.

BACKGROUND OF THE INVENTION

Communications networks are currently undergoing a revolution brought about by the increasing demand for real-time information being delivered to a diversity of locations. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks resembled a hierarchical star topology. All access from remote sites was channeled back to a central location where a mainframe computer resided. Thus, each transfer of data from one remote site to another, or from one remote site to the central location, had to be processed by the central location. This architecture is very processor-intensive and incurs higher bandwidth utilization for each transfer. This was not a major problem in the mid to late 1980s where fewer remote sites were coupled to the central location. Additionally, many of the remote sites were located in close proximity to the central location. Currently, hundreds of thousands of remote sites are positioned in various locations across assorted continents. Legacy networks of the past are currently unable to provide the data transfer speed and accuracy demanded in the marketplace of today.

In response to this exploding demand, data transfer through networks employing distributed processing has allowed larger packets of information to be accurately and quickly distributed across multiple geographic boundaries. Today, many communication sites have the intelligence and capability to communicate with many other sites, regardless of their location. This is typically accomplished on a peer level, rather than through a centralized topology, although a host computer at the central site can be appraised of what transactions take place and can maintain a database from which management reports are generated and operation issues addressed.

Distributed processing currently allows the centralized site to be relieved of many of the processor-intensive data transfer requirements of the past. This is typically accomplished using a data network, which includes a collection of routers. The routers allow intelligent passing of information and data files between remote sites. However, increased demand and the sophistication required to route current information and data files quickly challenged the capabilities of existing routers. Also, the size of the data being transmitted is dramatically increasing. Some efficiencies are obtained by splitting longer data files into a collection of smaller, somewhat standardized cells for transmission or routing. However, these efficiencies are somewhat offset by the processing required to reassemble or process the cells at nodes within the network.

More specifically, performing validity checks on the data file requires the system to physically reassemble an entire protocol data unit (data file) encapsulated in the cells before validity checks can be performed on the protocol data unit. This physical reassembly process increases the processing time and therefore decreases the throughput of the router. In view of the ever increasing demand for higher transmission speeds this is highly undesirable.

Accordingly, what is needed in the art is a system to overcome the deficiencies of the prior art.

SUMMARY OF THE INVENTION

To address the above-discussed deficiencies of the prior art, the present invention provides a checksum engine for use with a fast pattern processor and a method of operation thereof. In one embodiment, the checksum engine includes (1) a processing engine that performs partial checksums on at least a portion of each processing block associated with different protocol data units (PDUs), and (2) a controller that coordinates an operation of the processing engine to allow the processing engine to provide a complete checksum from the partial checksums of the processing blocks associated with each of the PDUs.

In another embodiment, the present invention provides a method of operating a checksum engine for use with a fast pattern processor that includes (1) performing partial checksums on at least a portion of each processing block associated with different PDUs, and (2) coordinating an operation of the performing to allow the performing to provide a complete checksum from the partial checksums of the processing blocks associated with each of the PDUs.

The present invention also provides, in another embodiment, a a fast pattern processor that includes (1) an internal function bus, (2) a context memory having a block buffer and a argument signature register, the block buffer includes processing blocks associated with a PDU, and (3) a pattern processing engine, associated with the context memory, that performs pattern matching. The fast pattern processor also includes a checksum engine having: (1) a processing engine that performs partial checksums on at least a portion of each processing block associated with different PDUs, and (2) a controller that coordinates an operation of the processing engine to allow the processing engine to provide a complete checksum from the partial checksums of the processing blocks associated with each of the PDUs.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
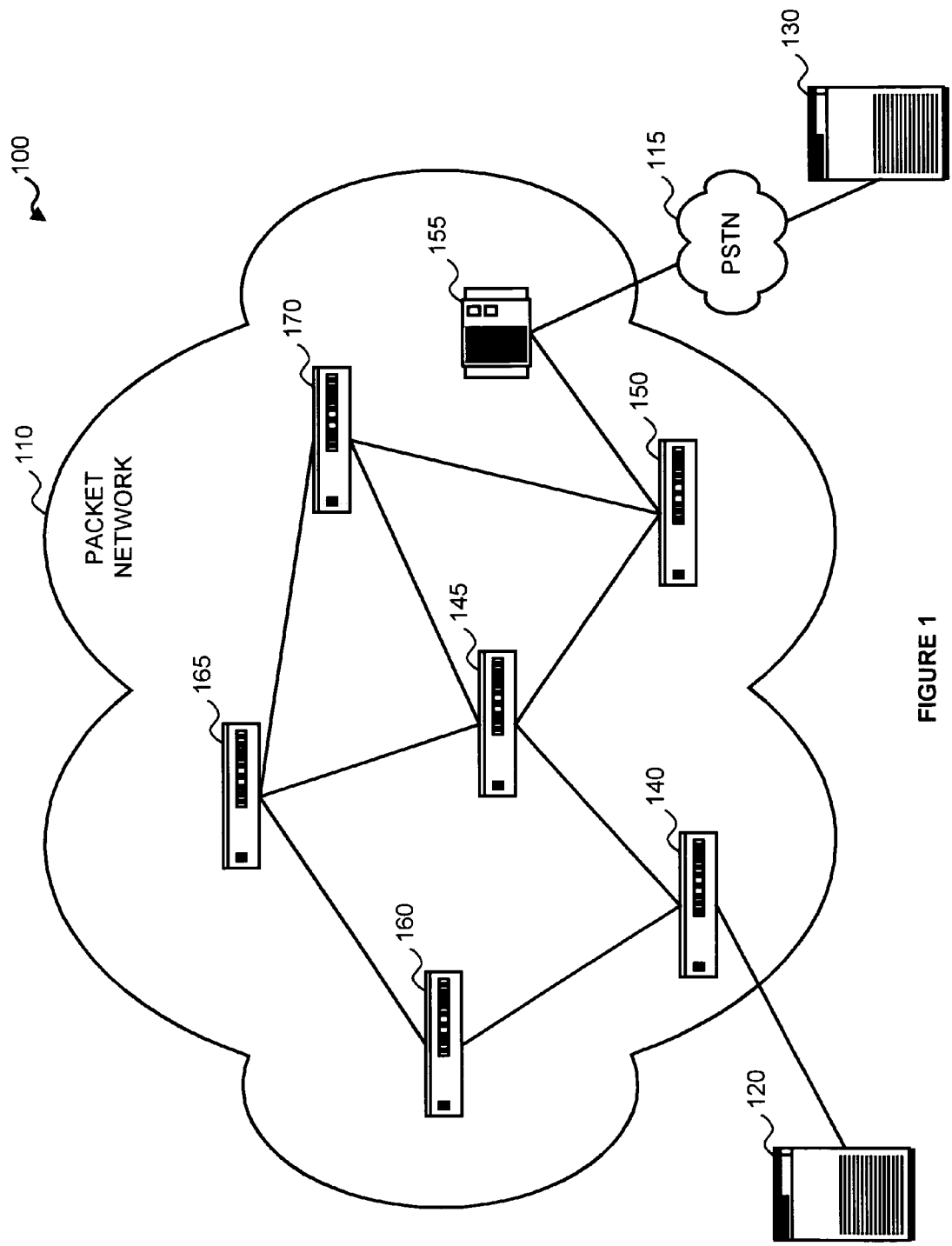
FIG. 1 illustrates a block diagram of an embodiment of a communications network constructed in accordance with the principles of the present invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may travers along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
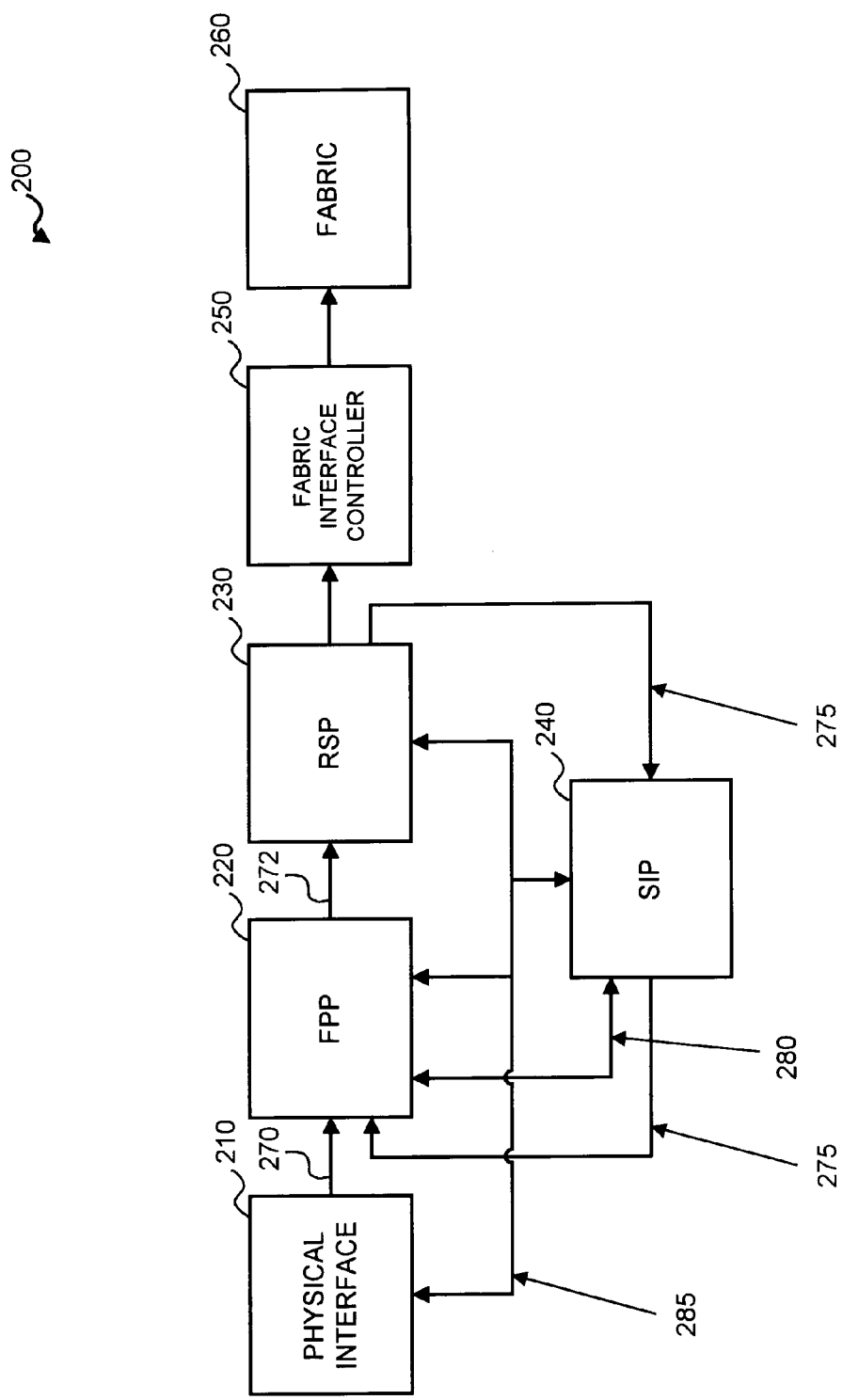
FIG. 2 illustrates a block diagram of an embodiment of a router architecture constructed in accordance with the principles of the present invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also includes a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units (PDUs) from the physical interface 210. The FPP 220 analyzes and classifies the PDUs and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packet and conclusions to the RSP 230. The second communication link 272 may be POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the PDUs classified by the FPP 220. The RSP 230 uses the classification information received from the FPP 220 to determine the starting offset and the length of the PDU payload, which provides the classification conclusion for the PDU. The classification information may be used to determine the port and the associated RSP 230 selected for the PDU. The RSP 230 may also receive additional PDU information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and CRCs. The RSP 230 may be programmed using a scripting language with semantics similar to the C language. Such script languages are well known in the art. Also connected to the RSP 230 are the fabric interface controller 250 and the fabric network 260. The fabric interface controller 250 provide the physical interface to the fabric 260, which is typically a communications network.

The SIP 240 allows centralized initialization and configuration of the FPP 220, the RSP 230 and the physical interfaces 210, 250. The SIP 240, in one embodiment, may provide policing, manage state information and provide a peripheral component interconnect (PCI) connection to a host computer. The SIP 240 may be a PayloadPlus™ Agere System Interface commercially available from Agere Systems, Inc.

Figure 3:
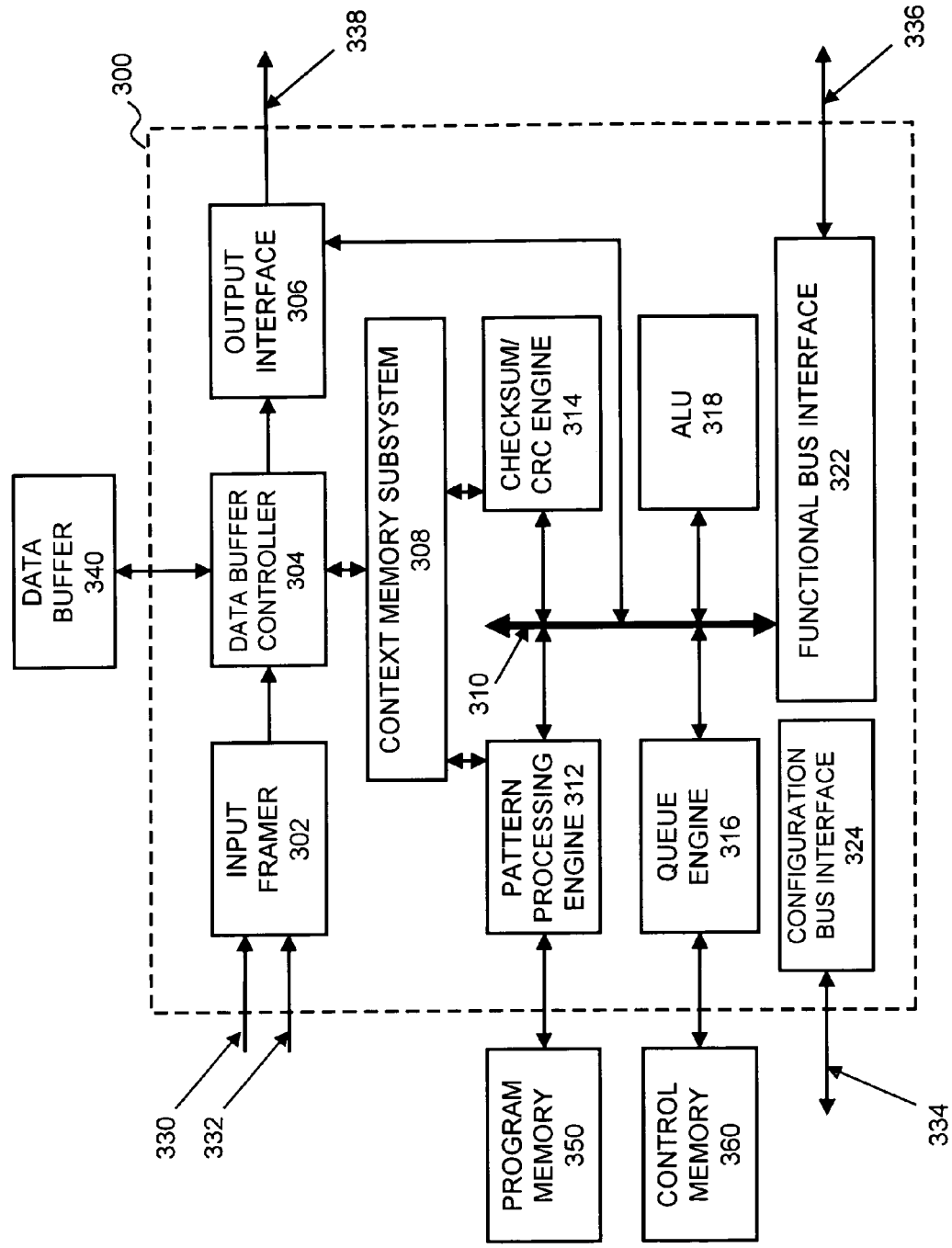
FIG. 3 illustrates a block diagram of an embodiment of a fast pattern processor constructed in accordance with the principles of the present invention.

Turning now to FIG. 3, illustrated is a block diagram of an embodiment of a fast pattern processor (FPP), generally designated 300, constructed in accordance with the principles of the present invention. The FPP 300 includes an input framer 302 that receives PDUs via external input data streams 330, 332. The input framer 302 frames packets containing the PDUs into 64-byte processing blocks and stores the processing blocks into an external data buffer 340. The input data streams 330, 332 may be 32-bit UTOPIA/POS-PHY from PHY and 8-bit POS-PHY management path interface from SIP 240 (FIG. 2), respectively.

Typically, a data buffer controller 304 is employed to store the processing blocks to the external data buffer 340. The data buffer controller 304 also stores the processing blocks and associated configuration information into a portion of a context memory subsystem 308 associated with a context, which is a processing thread. As illustrated, the context memory subsystem 308 is coupled to a data buffer controller 304.

Additionally, the context memory subsystem 308 is coupled to a checksum/cyclical redundancy check (CRC) engine 314 and a pattern processing engine 312. The checksum/CRC engine 314 performs checksum or CRC functions on processing block and on the PDUs embodied with the processing block. The pattern processing engine 312 performs pattern matching to determine how PDUs are classified and processed. The pattern processing engine 312 is coupled to a program memory 350.

The FPP 300 further includes a queue engine 316 and an arithmetic logic unit (ALU) 318. The queue engine 316 manages replay contexts for the FPP 300, provides addresses for block buffers and maintains information on blocks, PDUs, and connection queues. The queue engine 316 is coupled to an external control memory 360 and the internal function bus 310. The ALU 318 is coupled to the internal function bus 310 and is capable of performing associated computational functions.

Also coupled to the internal function bus 310 is a functional bus interface 322. The functional bus interface 322 passes external functional programming language function calls to external logic through a data port 336. In one exemplary embodiment, the data port 336 is a 32-bit connection to the SIP 240 (FIG. 2). The FPP 300 also includes a configuration bus interface 320 for processing configuration requests from externally coupled processors. As illustrated, the configuration bus interface 320 may be coupled to a data port 334, such as an 8-bit CBI source.

Additionally, coupled to the internal function bus 310 is an output interface 306. The output interface 306 sends PDUs and their classification conclusions to the downstream logic. The output interface 306 may retrieve the processing blocks stored in the data buffer 340 and send the PDUs embodied within the processing blocks to an external unit through an output data port 338. The output data port 338, in an exemplary embodiment, is a 32-bit POS-PHY connected to the RSP 230 (FIG. 2).

Figure 4:
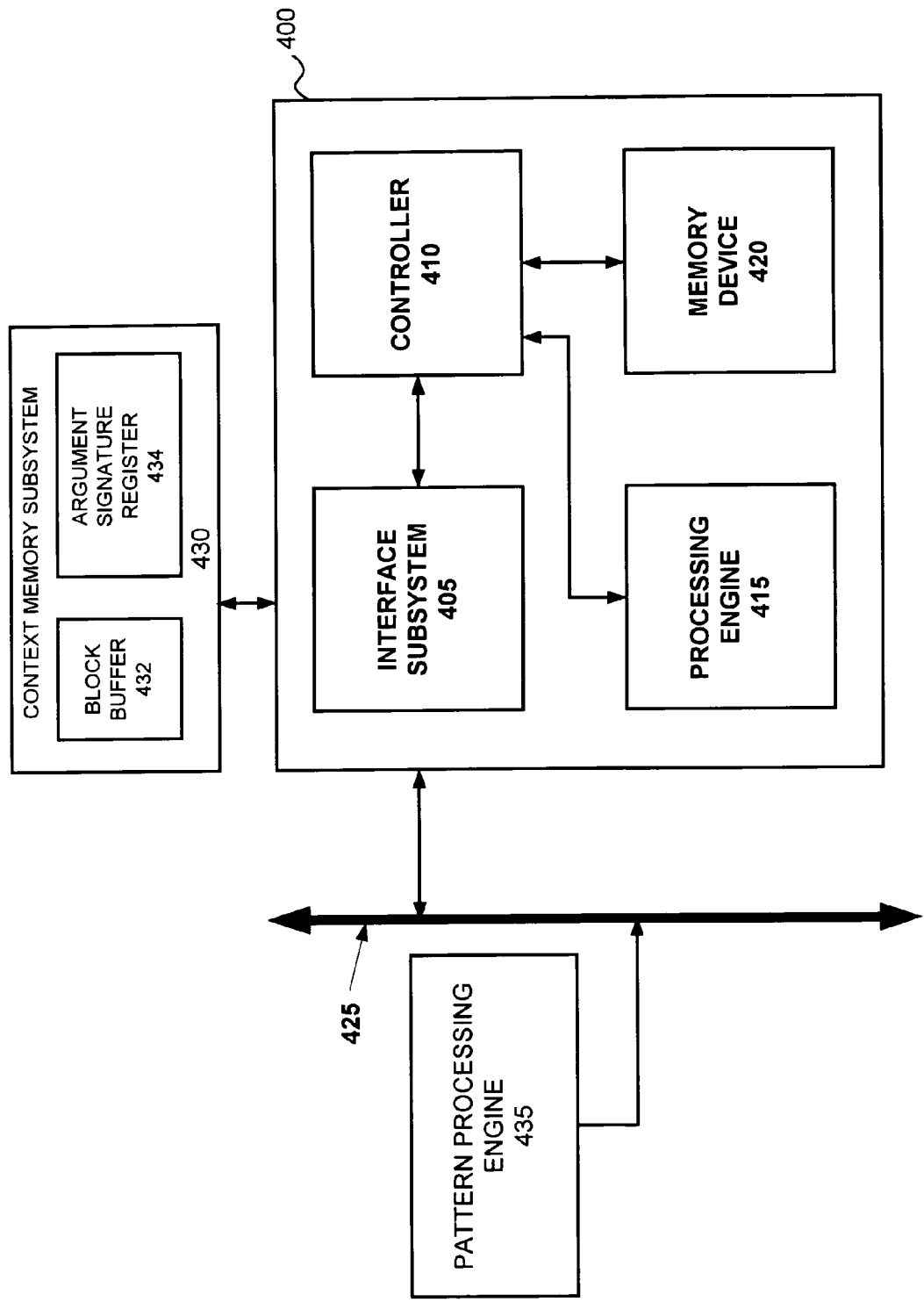
FIG. 4 illustrates a block diagram of an embodiment of a checksum engine for use with a fast pattern processor constructed according to the principles of the present invention.

Turning now to FIG. 4, illustrated is a block diagram of an embodiment of a checksum engine, generally designated 400, for use with a fast pattern processor constructed according to the principles of the present invention. The checksum engine 400 may be a co-processor of an FPP and performs checksum calculations on each processing block associated with different PDUs. See FIGS. 2 and 3 for a detailed description of the FPP. The checksum engine 400 includes an interface subsystem 405, a controller 410, a processing engine 415 and a memory device 420.

In one embodiment, the interface subsystem 405 is configured to receive each of the processing blocks associated with different PDUs. The processing engine 415 is configured to perform partial checksums on at least a portion of each processing block associated with different PDUs. For the purposes of the present invention, the phrase "configured to" means that the device, the system or the subsystem includes the necessary software, hardware, firmware or a combination thereof to accomplish the stated task. A "partial checksum" is a cumulative checksum that is calculated on at least a portion of one or more processing blocks. Each partial checksum is used in the calculation of the next partial checksum.

The memory device 420 is configured to store the partial checksums performed by the processing engine 415. In one embodiment, the memory device 420 may store a partial checksum for a header portion of the processing blocks, a partial checksum of a payload portion of the processing blocks, a partial checksum of a header portion of a PDU contained within one or more processing blocks, or a partial checksum for a payload portion of a PDU contained within one or more processing block. The controller 410 is configured to coordinate an operation of the processing engine 415 to allow the processing engine to provide a complete checksum from the partial checksums of the processing blocks associated with each of the different PDUs.

In the illustrated embodiment, the checksum engine 400 is coupled to an internal function bus 425 and a context memory subsystem 430 having a block buffer 432 and an argument signature register 434. The internal function bus 425 is employed to pass requests, function calls and other data between co-processors within the FPP. The block buffer 432 contains context locations that are used to store the processing blocks. The argument signature register 434 contains argument locations used to store arguments. Both the block buffer 432 and the argument signature register 434 are arranged and accessed by a context. See FIGS. 5A and 5B for a description of a block buffer and an argument signature register. The checksum engine 400 is also associated with a pattern processing engine 435 that performs functions on each of the processing blocks, such as pattern matching on at least a portion of each of the processing blocks.

The pattern processing engine 435, in one embodiment, may send requests to the interface subsystem 405 via an internal function bus 425 to perform a checksum on a processing block or a group of processing blocks associated with a particular PDU. In another embodiment, the pattern processing engine 435 may employ a context and an argument stored in the argument signature register 434 associated with that context to pass information to the checksum engine 400. The argument may indicate on which processing block the partial checksum calculation is to be performed.

For purposes of the present invention, a "context" is a processing thread identification and may include additional information. The context may be used to track and process processing blocks and pass information.

The interface subsystem 405 is also configured to receive requests from the internal function bus 425. In the illustrated embodiment, the pattern processing engine 435 sends a request to the interface subsystem 405 to perform a checksum calculation on a processing block. The interface subsystem 405, in conjunction with the controller 410 then receives the processing block. In one embodiment, the interface subsystem 405 may retrieve the processing block from the block buffer 432. In another embodiment, the interface subsystem 405 may retrieve the processing block from a data bus coupled to the checksum engine 400 as the processing block is stored in the block buffer 432. In yet another embodiment, the checksum engine 400 may retrieve a copy of the processing block from the memory device 420.

Based upon the request received, the controller 410 coordinates the operation of the processing engine 415 to perform a partial checksum on at least a portion of the received processing block associated with a PDU. The processing engine 415 may perform a partial checksum on a header portion of the processing block, on a payload portion of the processing block, on a header portion of a PDU encapsulated within the processing block or multiple processing blocks, or on a payload portion of a PDU encapsulated within the processing block or multiple processing blocks. In one embodiment, the processing engine 415 may concurrently perform partial checksums on different portions of the processing block. In another embodiment, the processing engine 415 may concurrently perform partial checksums on a plurality of processing blocks.

If the processing block received is the first processing block associated with a PDU, the processing engine 415 performs a partial checksum calculation on the processing block and stores the partial checksum. The processing engine 415, in one embodiment, may store the partial checksum in the memory device 420. On subsequent processing blocks associated with a particular PDU, the processing engine 415 retrieves the previous partial checksum associated with that particular PDU and performs a new partial checksum calculation employing the previous partial checksum. The processing engine 415 then stores the new partial checksum for the associated PDU. Thus, the checksum engine 400 may advantageously perform partial checksums on any processing block associated with any PDU. For example, the checksum engine 400 may calculate a partial checksum for a first processing block of a first PDU and then calculate a partial checksum for a third processing block of a second PDU.

If the processing block is the last processing block on an associated PDU, the controller 410 coordinates the processing engine 415 to provide a complete checksum for that particular PDU. A "complete checksum" is the partial checksum of the last processing block. The controller 410, in one embodiment, is also configured to validate the PDU against the complete checksum. In another embodiment, the controller 410 may validate a complete checksum that was generated from at least a portion of only one processing block.

One skilled in the art understands that a partial checksum may be performed on any portion of a PDU, processing block or group of processing blocks. Also, the present invention is not limited to performing a checksum. In other embodiments, the present invention may perform any type of partial validation calculation on the processing blocks and PDUs, such as a cyclical redundancy check (CRC).

Figure 5:
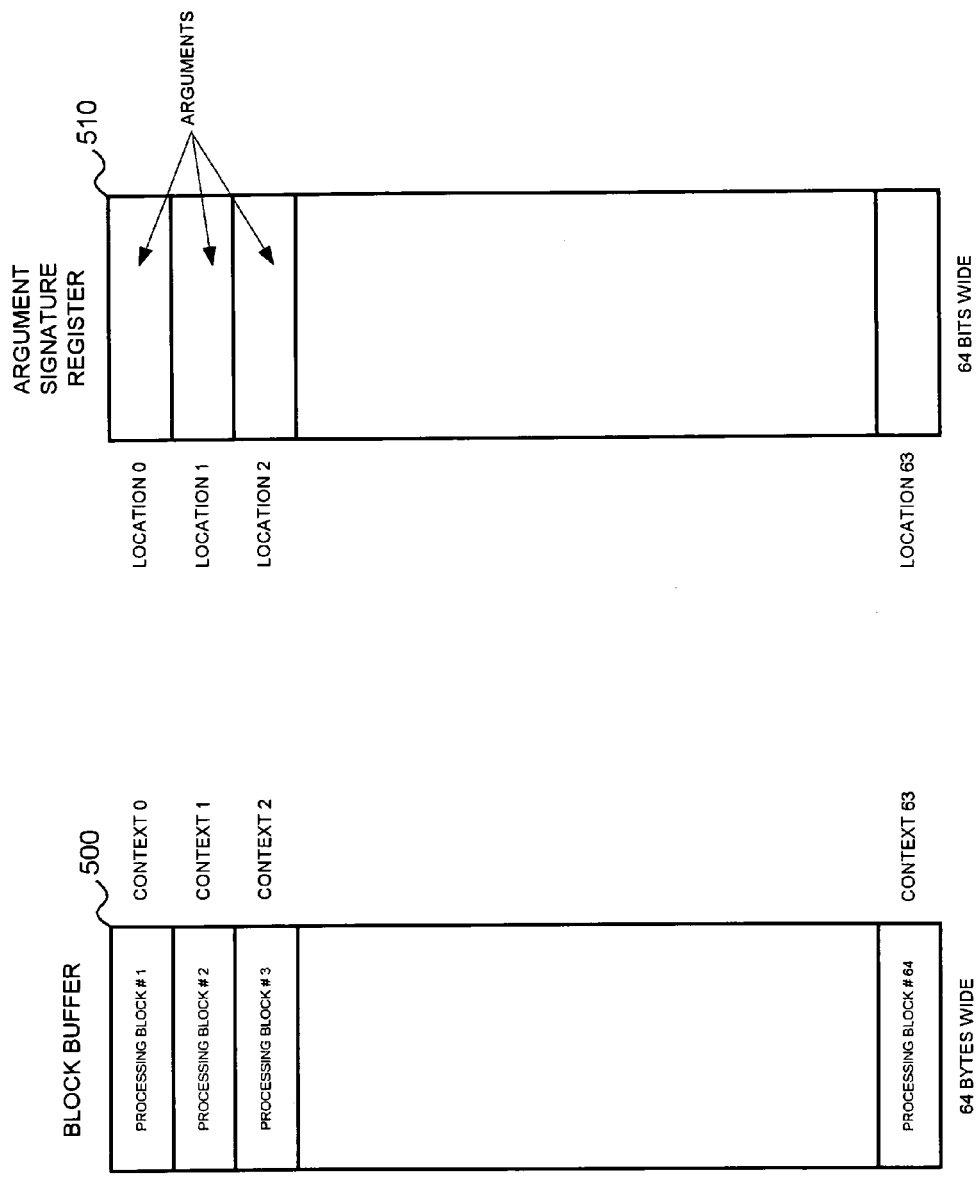
FIGS. 5A and 5B illustrate respective diagrams of embodiments of a block buffer and an argument signature register constructed in accordance with the principles of the present invention.

Turning now to FIGS. 5A and 5B, illustrated are respective diagrams of embodiments of a block buffer 500 and an argument signature register 510 constructed in accordance with the principles of the present invention. The block buffer 500 includes 64 different context locations ranging from context 0 through context 63, as shown. Each context location may contain one processing block. The block buffer 500 will therefore accommodate 64 processing blocks indicated as processing block # 1 through processing block # 64 wherein each processing block has a width of 64 bytes. Of course, however, the block buffer 500 is not limited to 64 context locations and a width of 64 bytes. Other embodiments of the present invention may have any number of context locations and wherein each location may be of any width.

The block buffer 500 is used to temporarily store a processing block associated with a PDU. Typically, processing blocks associated with a particular PDU are not stored contiguously in the block buffer 500. The storage location of a processing block is random and depends on context location availability at the time the processing block is stored.

The argument signature register 510 includes 64 different argument locations ranging from an argument location 0 to an argument location 63. Each argument location contains an argument that may be a queue number, a set of flags, offsets or a string number. Of course, an argument may contain any other type of information or parameter employable by the present invention. Each of the argument locations 0–63 will accommodate an argument of 64 bits in width. Of course, however, the argument signature register 510 is not limited to 64 argument locations and a width of 64 bits. Other embodiments of the present invention may have any number of argument locations and wherein each location may be of any width.

In the illustrated embodiment, each argument location corresponds to a context and is accessed using a context number. Thus, the present invention advantageously allows arguments to be passed between different co-processors using a context number.

Figure 6:
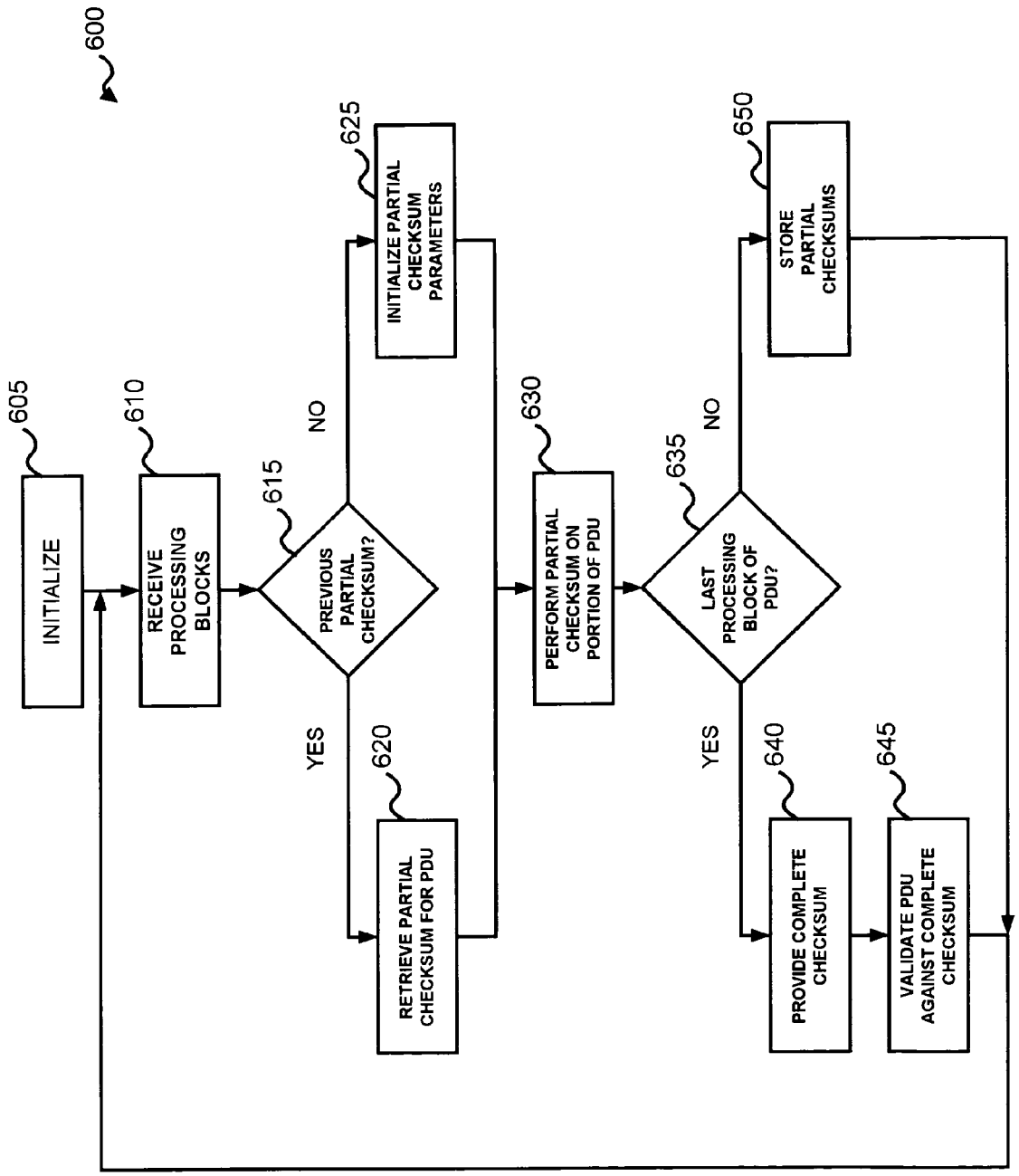
FIG. 6 illustrates a flow diagram of an embodiment of a method of performing partial checksum on processing blocks in a fast pattern processor constructed in accordance with the principles of the present invention.

Turning now to FIG. 6, illustrated is a flow diagram of an embodiment of a method, generally designated 600, of performing partial checksums on processing blocks in a fast pattern processor constructed in accordance with the principles of the present invention. The method 600 starts with an initialization of a checksum engine in a step 605 and then a receiving of a processing block in a step 610. A determination is made in a first decisional step 615 as to whether a previous partial checksum exists that is associated with the processing block received in the step 610. If a partial checksum does exist, the existing partial checksum for the associated PDU is retrieved in a step 620. If a partial checksum does not exist, the checksum engine initializes partial checksum parameters in a step 625.

Next, a continuing or new partial checksum is performed on a portion of the received processing block associated with a PDU, in a step 630. In the illustrated embodiment, the portion of the processing block associated with performing the partial checksum may be selected from the group consisting of a header and a payload. Thus, the method 600 accommodates performing a partial checksum on either the header or the payload portion of the processing block. In an alternative embodiment, multiple partial checksums may be concurrently performed on different portions of each processing block.

The method 600 accommodates sequentially performing partial checksums on processing blocks associated with different PDUs. That is, sequential partial checksums may be performed on processing blocks associated with different PDUs wherein such processing blocks are randomly received. In another embodiment, partial checksums may be concurrently performed on a plurality of processing blocks associated with either the same PDU or a plurality of different PDUs.

Then, a second decisional step 635 determines if the received processing block is the last processing block of an associated PDU. When the last processing block is received, the method 600 coordinates the operation to provide a complete checksum from the partial checksums of the processing blocks for the associated PDU in a step 640. Next, the PDU is validated against the complete checksum in a step 645. If the received processing block is not the last processing block, the partial checksum or checksums performed in the step 630 are then stored in a step 650. At the conclusion of the step 645 or the step 650, the method 600 returns to the step 610 to receive another processing block.

One skilled in the art should know that various methods of partially validating processing blocks and PDUs may be employed by the present invention. Moreover, other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A validation engine for use with a fast pattern processor, comprising:
   a processing engine configured to perform partial validation calculations concurrently on at least a portion of each processing block associated with different protocol data units (PDUs); and
   a controller configured to coordinate an operation of said processing engine to allow said processing engine to provide a partial validation calculation of a last one of said processing blocks associated wit each of said different PDUs as a complete validation calculation for each of said different PDUs.

2. The validation engine as recited in claim 1 wherein said validation engine is a checksum engine, said partial validation calculation is a partial checksum and said complete validation calculation is a complete checksum.

3. The validation engine as recited in claim 1 further comprising a memory device configured to store said partial validation calculations.

4. The validation engine as recited in claim 1 wherein said partial validation calculation is a cyclical redundancy check (CRC).

5. The validation engine as recited in claim 1 wherein said controller is further configured to validate each of said PDUs against said complete validation calculation.

6. The validation engine as recited in claim 1 wherein said processing blocks have a width of 64 bytes.

7. The validation engine as recited in claim 1 wherein said processing engine is further configured to concurrently perform partial validation calculations on different portions of each of said processing blocks.

8. A method of operating a checksum engine for use with a fast pattern processor, comprising:

concurrently performing partial checksums on at least a portion of each processing block associated with different protocol data units (PDUs); and coordinating an operation of said performing to allow said performing to provide a partial checksum of a last one of said processing blocks associated with each of said PDUs as a complete checksum for each of said different PDUs.

9. The method as recited in claim 8 further comprising performing partial checksums on an entirety of said each processing block.

10. The method as recited in claim 8 further comprising storing said partial checksums.

11. The method as recited in claim 8 wherein said portion of said each processing block is selected from the group consisting of:
   a header, and
   a payload.

12. The method as recited in claim 8 further comprising validating each of said PDUs against said complete checksum.

13. The method as recited in claim 8 wherein said processing blocks have a width of 64 bytes.

14. The method as recited in claim 8 wherein said performing further comprises concurrently performing partial checksums on different portions of each of said processing blocks.

15. A fast pattern processor, comprising:
   an internal function bus;
   a context memory subsystem having a block buffer and a argument signature register, said block buffer includes processing blocks associated with a protocol data unit (PDU);
   a pattern processing engine, associated with said context memory, that performs pattern matching; and
   a checksum engine, including:
      a processing engine that performs partial checksums concurrently on at least a portion of each said processing block associated with different PDUs; and
      a controller that coordinates an operation of said processing engine to allow said processing engine to provide a partial checksum of a last one of said processing blocks associated wit each of said PDUs as a complete checksum for each of said different PDUs.

16. The fast pattern processor as recited in claim 15 further comprising an interface subsystem configured to receive said processing blocks.

17. The fast pattern processor as recited in claim 15 further comprising a memory device configured to store said partial checksums.

18. The fast pattern processor as recited in claim 15 wherein said portion of said each processing block is selected from the group consisting of:
   a header, and
   a payload.

19. The fast pattern processor as recited in claim 15 wherein said controller is further configured to validate each of said PDUs against said complete checksum.

20. The fast pattern processor as recited in claim 15 wherein said processing blacks have a width of 64 bytes.

21. The fast pattern processor as recited in claim 15 wherein said processing engine is further configured to concurrently perform partial checksums on different portions of each of said processing blocks.

* * * * *